Nov. 22, 1960  K. SCHRÖTER ET AL  2,960,852
OVERLOAD CLUTCH

Filed Sept. 8, 1959  2 Sheets-Sheet 1

Inventors
KURT SCHRÖTER
BERNHARD WALTERSCHEID-MÜLLER

By Toulmin & Toulmin
Attorneys

Nov. 22, 1960     K. SCHRÖTER ET AL     2,960,852
OVERLOAD CLUTCH

Filed Sept. 8, 1959                      2 Sheets-Sheet 2

INVENTORS
KURT SCHRÖTER
BERNHARD WALTERSCHEID-MÜLLER

BY Toulmin & Toulmin

ATTORNEYS

2,960,852
Patented Nov. 22, 1960

2,960,852
OVERLOAD CLUTCH

Kurt Schröter and Bernhard Walterscheid-Müller, Lohmar, Germany

Filed Sept. 8, 1959, Ser. No. 838,578

Claims priority, application Germany Sept. 8, 1958

6 Claims. (Cl. 64—29)

The present invention relates to an overload clutch and more particularly to an overload clutch with at least three resiliently supported tangentially spaced follower members, which clutch can be arranged between universal joints.

The overload clutches known in the art cannot be arranged between universal joints. In a shaft connection comprising universal joints, the joints must be spaced with respect to each other by 180°. If a conventional overload clutch would be arranged between the universal joints, the joints could be displaced from their required position whenever the clutch is reengaged in any position after having been disengaged to take care of an overload. For this reason it has not been possible to dispose any of the known overload clutches between the universal joints in a space saving manner.

It is an object of the present invention to provide an overload clutch which can be arranged between universal joints requiring comparatively little space and which is rather inexpensive.

It is a further object of the present invention to provide an overload clutch which can easily be disassembled for exchanging worn-out parts.

It is still another object of the present invention to provide an overload clutch which has a long service life.

These objects are achieved by the overload clutch of the present invention which comprises at least three tangentially spaced follower members which are resiliently supported on one portion of the clutch, which follower members engage recesses in the other portion of the coupling for the transmission of torque, and which follower members are so spaced relative to one another that the full locking effect is obtained in two positions only, which positions are obtained each after a rotation of 180°.

The invention will be more fully understood upon the following detailed description of the accompanying drawings, wherein—

Figure 1:
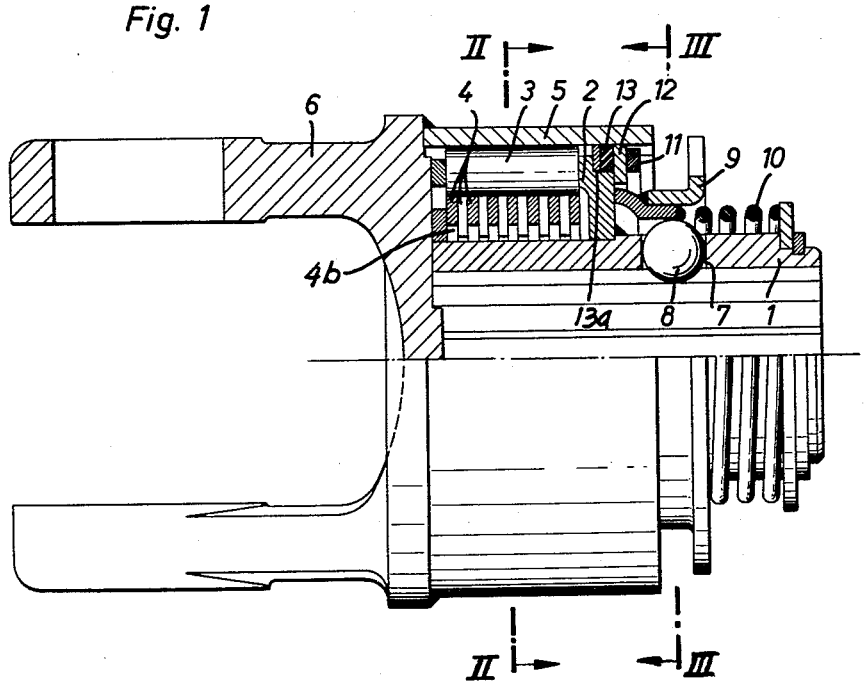
Figure 1 is a partly sectional side view of the overload clutch, according to the invention.
Figure 2:
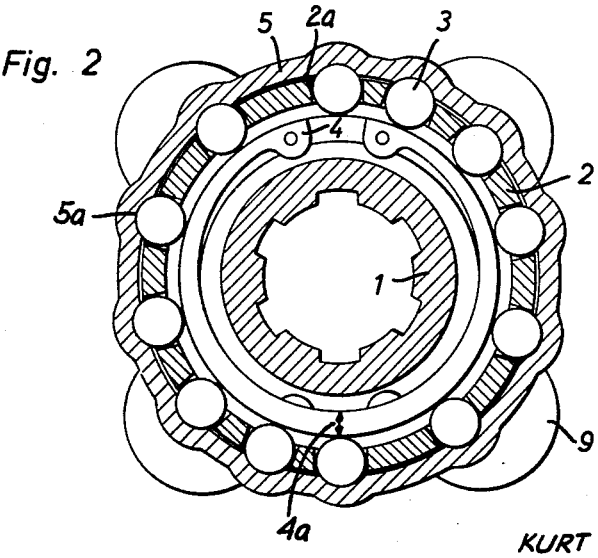
Figure 2 is a cross sectional view of the overload clutch taken along lines II—II of Figure 1.
Figure 3:
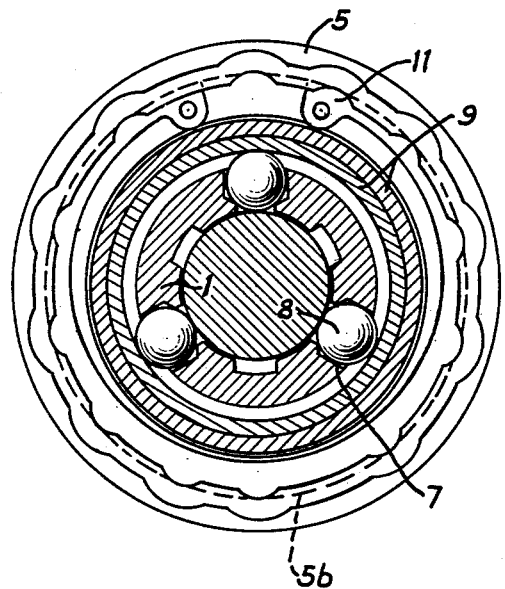
Figure 3 is a cross sectional view of the overload clutch taken along lines III—III of Figure 1.

Part of the clutch consists of a tubular hub 1 which is mounted on a shaft end, not shown in the drawings. A cup-shaped holding member 2, concentrically disposed with respect to tubular hub 1 is provided with longitudinal slots 2a. In these longitudinal slots there are arranged cylinder-shaped follower members 3, disposed in the wall of holding member 2. The follower members are pressed into recesses 5a by annular spring means 4. The recesses 5a are provided in the inner wall of cylinder 5, which latter is fixedly connected with a fork-shaped joint 6. The annular spring means 4 press directly against the cylinder-shaped follower members 3, thus urging them into recesses 5a of cylinder 5. The annular spring means 4 have a cut-away section and thus are opened. Opposite to this opened end they have their largest cross section 4a which tapers regularly in either direction towards the cut-away section. Furthermore, the annular spring means 4 are freely rotatable relative to the tubular hub 1 as well as relative to each other. They have a comparatively small width 4b and therefore it is possible to juxtapose a plurality of such annular spring means without requiring considerable space. This also results in the further advantage that the spring means can be easily dismounted. It is also possible to adjust the desired limiting torque by using a different number of spring means.

The tubular hub 1 has a plurality of radial drillings 7 in which balls 8 can be radially displaced and can engage an annular groove provided in the shaft end. Thereby the tubular hub 1 is axially securely supported on the shaft end. A ring 9 having a conically shaped enlarged end portion is axially displaceably disposed above the balls 8 and is held by a spring 10 in the position shown in Figure 1, which is the locking position wherein the balls 8 are pressed via ring 9 in a radial direction towards the center of the hub.

The cylinder 5 is provided at its open end with an annular groove 5b in which there rests a radially resilient support ring 11 axially supporting the cup-shaped holding member 2 via an intermediate sheet 12, a sealing 13 and a sealing ring 13a.

If the resilient support ring 11 is removed, it is easy to disassemble the clutch which otherwise is securely closed and sealed in assembled position.

Thus, according to the invention the overload clutch is provided with at least two tangentially spaced follower members resiliently supported on one part of the clutch and engaged in recesses on the other part of the clutch for the torque transmission. The follower members are so spaced and arranged relative to each other that the full locking effect is obtained in two switch positions only, each of which is obtained after a turn of 180°. For this purpose the bearings for the support member are arranged on one part of the clutch and the recesses for the engagement on the other part of the clutch. The bearings as well as the recesses are placed at different distances from each other, for instance, they can be so arranged that the distances on each semicircle are 30°, 40°, 50° and 60°.

According to one embodiment of the invention the followers 3 are located in the wall of the cup-shaped holding means 2 which is connected with tubular hub 1 and encloses annular spring means 4. These annular spring means 4 press the cylindrical followers 3 radially in outward direction and engage the same with the recesses 5a, which are arranged in a joint 6 which joint is connected with cylinder 5. The annular spring means 4 are opened and opposite that opening they have the largest section which tapers symmetrically on both sides. They are rotatably arranged relative to the tubular hub 1.

According to another, preferred embodiment of the invention the tubular hub 1 is provided with conventional radial drillings in which there are arranged radially moveable balls 8. These balls 8 are engaged with an annular groove on a shaft end by means of an axially moveable ring with a conical end. Such an arrangement is particularly advantageous, space saving and inexpensive.

After an overload has occurred during which the overload clutch became disengaged, the clutch always reengages in two positons which are displaced relative to each other by 180°. It is only in these two positions that all follower members are in operation and the full torque is transmitted while during all other possible engaging positions some of the follower members are disengaged, so that only a small torque is transmitted. The clutch automatically adjusts the joints so as to assume the correct position relative to each other, whenever the full torque is transmitted. It is, therefore, possible to arrange such a clutch between two universal joints, thereby saving a great deal of space.

The overload clutch according to the invention has the further advantage that the torsional vibrations caused by the engaging and disengaging operation reach their maximum amplitude twice only during each revolution of the clutch shaft. This means a remarkable reduction of stress in the clutch material and results in a longer service life of the clutch compared with known clutches which reach the maximum value up to twelve times during each single revolution.

It is a further advantage of the invention that for the overload clutch very little space is required. The clutch is suitable for the transmission of very high torques.

Still another advantage resides in the fact that the tubular hub can be quickly and securely mounted on a shaft end, on which it is secured against axial forces. The mounting can be effected without using any tools.

Furthermore, it is advantageous that the follower members of the overload clutch have a high resistance to wear because of their cylinder-shaped configuration.

The construction of the overload clutch is easy and its disassemblage for exchanging worn-out parts can be done by an unskilled person.

It will be understood that this invention is susceptible to modification in order to adapt it to different usages and conditions and, accordingly, it is desired to comprehend such modifications within this invention as may fall within the scope of the appended claims.

What is claimed is:

1. An overload clutch comprising a first portion and a second portion for mutual engagement and disengagement, at least three tangentially spaced follower members disposed therebetween, resilient means disposed between said first and second portion, said means resiliently supporting said follower members against said first portion of the clutch, a plurality of recesses in said second portion of the clutch adapted to receive said follower members, thereby operatively coupling said first portion with said second portion, said recesses in said second portion being spaced at unequal distances from one another, so that in any position between 0 and 180° the position of only two oppositely disposed follower members coincides with two of said recesses in said second portion of the clutch.

2. An overload clutch as described in claim 1, said recesses being spaced at distances corresponding to 30°, 40°, 50° and 60° on a semicircle.

3. An overload clutch comprising at least three tangentially spaced cylinder-shaped members, a tubular hub, a cup-shaped holding member fixedly connected with said hub, having a plurality of slots receiving said cylinder-shaped members, a fork-shaped joint, a cylinder fixedly connected with said fork-shaped joint and having a plurality of recesses adapted to receive said cylinder-shaped members, and a plurality of annular resilient members inside said cup-shaped holding member and urging said cylinder-shaped members into said recesses, said cylinder-shaped members being spaced relative to one another so that the full locking effect is obtained in two positions only, each of which is obtained after a rotation of 180°.

4. An overload clutch as described in claim 3, with a section of said annular resilient members being cut away, said resilient members having the greatest cross-section opposite to the area of the cut-away section and slightly tapering towards both ends.

5. An overload clutch as described in claim 3, said resilient members being disposed freely rotatably relative to one another and relative to said tubular hub.

6. An overload clutch as described in claim 3, comprising a shaft associated with the clutch having an annular groove, said tubular hub having a plurality of radial borings, a plurality of balls radially displaceably disposed in said radial borings, and an axially displaceable ring having a conically shaped end portion and adapted to engage said balls with the annular groove in said shaft.

References Cited in the file of this patent

UNITED STATES PATENTS

| | | |
|---|---|---|
| 1,274,722 | Lacey | Aug. 6, 1918 |
| 1,909,366 | Koza | May 16, 1933 |
| 2,072,924 | Smyth | Mar. 9, 1937 |
| 2,909,047 | Walterscheid-Muller et al. | Oct. 20, 1959 |